UNITED STATES PATENT OFFICE.

HENRY R. WRIGHT, OF ALBANY, NEW YORK.

MANUFACTURE OF ARTIFICIAL BUTTER.

SPECIFICATION forming part of Letters Patent No. 267,637, dated November 14, 1882.

Application filed July 25, 1882. (No specimens.)

*To all whom it may concern:*

Be it known that I, HENRY R. WRIGHT, of Albany, in the county of Albany and State of New York, have invented a new and useful Improvement in the Manufacture of Artificial Butter, of which the following is a full, clear, and exact description.

This invention has for its object the production of an improved substitute for butter, applicable both for table and culinary purposes, and which I denominate "creamine."

My invention consists in the improved process of combining under peculiar conditions hereinafter described certain old ingredients—to wit, sweet cream, oleomargarine or oil derived from tallow, an oil derived from lard or hog-fat, and an oil derived from butter, all of which oils are rendered, without cooking, from the stock used, at the low temperature of about 90°, with the aid of pressure, as hereinafter described, and which are mixed with one or more vegetable oils—such as the oil of sesame, or benne, or oil of sunflower-seed, or cotton-seed, together with salt, ice, and coloring-matter—as, for instance, annotto or annatoine, as used in coloring butter. The proportions of these ingredients will be determined by the temperature of the season in which the article is made, as hereinafter set forth. Before describing the mixing of the ingredients, however, and their treatment after mixing, I will proceed to specify the manner of obtaining the ingredients, or certain of them.

To obtain the sweet cream I take fresh milk and allow it to stand until the animal heat is extracted, and then place it in a deep narrow vessel surrounded by water kept at a temperature of about 40° or 45° Fahrenheit, and after leaving it in this vessel for a period of from six to ten hours, more or less, I draw away the milk while still sweet and leave the cream also sweet.

To obtain oil of tallow I take the soft part—or what is known as the "caul"—from rough tallow, or intestinal fat of the cow or beef, and hash it very fine in a sausage-hasher or other suitable machine, and, placing it in small quantities—of about five pounds—in cloths, subject it to heavy pressure in a room heated to about 90° Fahrenheit, when the oil will flow without having resort to cooking.

I obtain the oil of lard by taking leaf-lard or the intestinal fat of hogs and treat it in the same way as I do the tallow.

My object in rendering these oils by hashing and pressure is to avoid cooking and the subjecting of them to any greater heat than milk is subjected to in its elaboration within the cow.

The oil of butter I obtain by subjecting butter to pressure in the same way that I do the oil of tallow, with the exception that I do not hash the material.

The oil of lard is used to soften the oil of tallow, while the oil of butter, together with the vegetable oils mentioned, is used to give texture and a butter-like appearance to the compound. I use annotto or annatoine to color the product, and salt to give it flavor.

The proportion of the several ingredients is or may be about as follows: For summer use, to make one hundred pounds of "creamine," or "butterine," as it may be termed, I take twenty parts, by measurement, of sweet cream, sixty parts oil of tallow, fifteen parts of oil of lard, ten parts oil of butter, five parts of any of the vegetable oils mentioned, ten pounds of salt, and half a gill of annotto, annatoine, or other suitable butter-coloring matter.

To prepare the compound for winter use I take twenty parts, by measurement, of sweet-oil, forty-five parts oil of tallow, twenty-five parts oil of lard, ten parts of any of the vegetable oils named, ten pounds of salt, and half a gill of annotto, annatoine, or butter-coloring matter. To make the product I mix the hereinbefore-named ingredients together and sour them under a temperature of about 80° Fahrenheit, as milk and cream are soured for making butter, and after the same have been properly soured together and the whey drawn off I churn the mass, which, by the operation of the churn and chilling it by running it on pulverized ice, becomes a butter-like product that is pure, wholesome, and almost if not equally as good as butter, but which can be sold at much less expense than butter, thereby benefiting in particular the poor as consumers.

If desired, sugar and saltpeter in small quantities may be added to the salt to flavor the compound.

In defining my invention more clearly I would state that I am aware that the oils derived from tallow and lard have been combined with vegetable oils, and also with loppered cream or milk and coloring-matter, in the manufacture of artificial butter. I am also aware that the animal oils have been extracted by the aid of heat and pressure, and I do not claim these operations, broadly. My invention is distinctive in the following respects: first, in the extraction of the animal oils at or about the low temperature of 90° without previous melting and in one pressing, and, secondly, in mixing the cream, the animal oils, and the vegetable oils in a sweet condition and allowing them to sour together before churning, by which I get a very superior flavor.

Having thus fully described my invention, I claim as new and desire to secure by Letters Patent—

1. The process of making artificial butter or creamine, which consists in mixing together the oils derived from animal fat at low temperatures with sweet cream, the oil of butter, vegetable oil, and coloring-matter, then allowing these ingredients to become sour while together, then removing the whey, and finally churning the mass, substantially as and for the purpose described.

2. In the manufacture of artificial butter, the process of mixing the derived oils which form the base with the dairy products in sweet condition, allowing them to sour together, and then removing the whey and churning, as described.

HENRY R. WRIGHT.

Witnesses:
ISAAC B. WHIPPLE,
A. GREGORY.